United States Patent
Edara

(10) Patent No.: US 8,611,307 B2
(45) Date of Patent: Dec. 17, 2013

(54) SERVER ASSISTED HIGHER PRIORITY PLMN SCAN

(75) Inventor: Kiran K. Edara, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 246 days.

(21) Appl. No.: 13/092,105

(22) Filed: Apr. 21, 2011

(65) Prior Publication Data

US 2012/0269163 A1 Oct. 25, 2012

(51) Int. Cl.
*H04W 4/00* (2009.01)
*H04W 48/16* (2009.01)

(52) U.S. Cl.
USPC .......................................... 370/331; 370/341

(58) Field of Classification Search
None
See application file for complete search history.

(56) References Cited

U.S. PATENT DOCUMENTS

| | | | | |
|---|---|---|---|---|
| 2006/0178144 A1* | 8/2006 | Kuroda | | 455/432.1 |
| 2009/0036116 A1* | 2/2009 | Kim et al. | | 455/423 |
| 2009/0215447 A1* | 8/2009 | Catalano et al. | | 455/432.1 |
| 2009/0238114 A1* | 9/2009 | Deshpande et al. | | 370/328 |
| 2011/0130118 A1* | 6/2011 | Fan et al. | | 455/411 |
| 2011/0130140 A1* | 6/2011 | Fadell | | 455/435.2 |
| 2011/0302014 A1* | 12/2011 | Proctor et al. | | 705/14.23 |
| 2012/0149366 A1* | 6/2012 | Mariblanca Nieves et al. | | 455/426.1 |

* cited by examiner

*Primary Examiner* — Chi Pham
*Assistant Examiner* — Soon-Dong D Hyun
(74) *Attorney, Agent, or Firm* — Lowenstein Sandler LLP

(57) ABSTRACT

Methods and systems facilitating a server-assisted scan for a preferred network are disclosed. A user device may identify a cell at a present location of the user device, and request one or more records associated with the identified cell from a server. If the server provides a record associated with the identified cell, the user device may determine whether the provided record includes preferred network data identifying a preferred network previously found on the identified cell. If the provided record does not include the preferred network data, the user device may start a scan timer that is set to a predefined time interval. If the provided record includes the preferred network data, the user device may initiate a preferred network scan without starting the scan timer.

24 Claims, 9 Drawing Sheets

SERVER ASSISTED HIGHER PRIORITY PLMN SCAN

BACKGROUND

In today's wireless communication networks, Public Land Mobile Networks (PLMNs) have been established to provide land mobile telecommunications service to user devices such as electronic book readers, cellular telephones, personal digital assistants (PDAs), portable media players, tablet computers, netbooks, and the like. Generally, each service provider operates its own PLMN, and the number of PLMNs in a country may vary from a single PLMN in a small country to as many as fifty or more in a large country.

Upon initial power up, a user device typically attempts to register with its own service provider's PLMN (the home PLMN). If the user device is located outside of the area covered by the home PLMN, the user device attempts service acquisition on another PLMN, which is commonly known as roaming. Typically, a prioritized list of PLMNs that the user device is allowed to access is stored on a Subscriber Identity Module (SIM) card. The entries and prioritization in the list are usually based on agreements contracted among the various service providers.

When a user device is camped on a PLMN that is not its home PLMN or the highest priority PLMN, the user device usually performs a PLMN scan trying to find its home PLMN or a higher priority PLMN. A PLMN scan is repeated at predetermined time intervals, as defined in a standard specification, such as the $3^{rd}$ Generation Partnership Project (3GPP) specification. For example, the 3GGP specification requires that a PLMN scan be performed every (6*n) minutes, where "n" is configurable by a service provider and is often set to 1, resulting in a PLMN scan being performed every 6 minutes.

If during a PLMN scan, a home PLMN or a higher priority PLMN is found, the user device immediately sends a request to register with this PLMN. However, if the user device does not find a home PLMN or a higher priority PLMN, the user device continues to perform the PLMN scans every 6 minutes. Such periodic PLMN scans significantly increase current drain of the user device's battery. In addition, if the user device moves to a location where a home PLMN or a higher priority PLMN is present, it would take the user device up to 6 minutes to find that PLMN. For example, if the user device moves to such a location immediately after the last PLMN scan, the user device will not perform the next PLMN scan until the 6-minute time interval expires, thus resulting in 6 minutes of unnecessary roaming charges.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
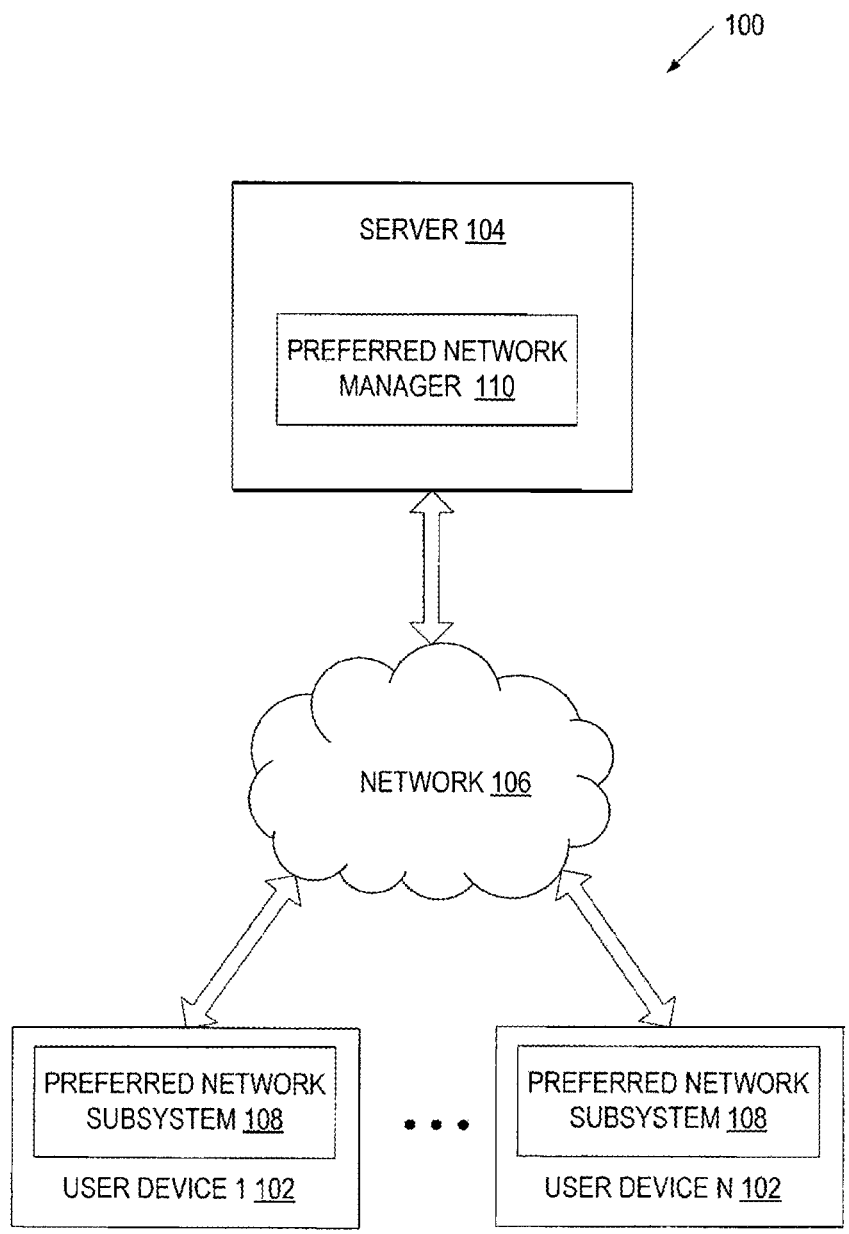
FIG. 1 is a block diagram of an exemplary network architecture in which embodiments of the invention may operate.

Methods and systems for facilitating server assisted preferred network scans performed by user devices are described. A user device may be any mobile or content rendering device. Examples of such user devices include electronic book readers, cellular telephones, personal digital assistants (PDAs), portable media players, tablet computers, netbooks, and the like. A user device may connect to a network to obtain content from a server or to perform other activity.

In one embodiment, a server stores network data records provided by different user devices. A network data record identifies a first network from which a user device was receiving service and a second network that was found by the user device while receiving service from the first network. The second network, also referred to herein as a preferred network, is the home network of a user device or a network that has a higher priority than the first network with respect to roaming service. User devices can find preferred networks when performing preferred network scans at predefined time intervals as required by a standard specification (e.g., 3GPP specification). In one embodiment, if a user device performs a preferred network scan and does not find any preferred networks, the user device may provide to the server a network data record that only identifies the first network, and optionally a list of any other networks found at this location.

In one embodiment, upon a power-on event or a network change, a user device identifies a network at its present location, requests records associated with the identified network from the server, and stores the records associated with the identified network in a local data store. Subsequently, when the user device camps on a new cell, the user device searches the local data store for a record corresponding to the new cell. If the user device finds a record corresponding to the new cell, the user device may initiate a preferred network scan without waiting for a predefined time interval to expire. If the user device does not find a record corresponding to the new cell or finds a records indicating that no preferred network was found at this location, the user device may adjust the predefined time interval to perform preferred network scans at a slower rate. In another embodiment, rather than pre-storing the records associated with the identified network in the local data store, the user device may request such records from the server at every expiry of the predefined time interval and then make a decision with respect to a preferred network scan.

The use of a centralized network data store allows user devices to share information on preferred networks found at different locations. Based on this information, a user device can determine whether a preferred network is likely to be found at its current location. If so, the user device can perform a preferred network scan immediately, without waiting for a predetermined time interval to expire, thereby eliminating unnecessary roaming charges. If a preferred network is unlikely to be found at its current location, the user device can adjust the predetermined time interval to perform preferred network scans at a slower rate, thus reducing current drain of the user device's battery.

FIG. 1 is a block diagram of exemplary network architecture 100 in which embodiments of the invention may operate. The network architecture 100 may include a server 104 and multiple user devices 102 coupled to the server 104 via a network 106 (e.g., public network such as the Internet or private network such as a local area network (LAN)).

The user devices 102 are variously configured with different functionality to enable voice communication and/or consumption of one or more types of media items. The media items may be any type or format of digital content, including, for example, electronic texts (e.g., eBooks, electronic magazines, digital newspapers), digital audio (e.g., music, audible books), digital video (e.g., movies, television, short clips), images (e.g., art, photographs), multi-media content and software updates. The user devices 102 may include any type of computing devices such as electronic book readers, portable digital assistants, mobile phones, laptop computers, portable media players, tablet computers, cameras, video cameras, netbooks, notebooks, desktop computers, gaming consoles, DVD players, media centers, and the like.

The server 104 may be a cloud server, a network operator (service provider) server, a content provider server, an access point provider server, or any other server that provides various services to user devices 102 via the network 106. In one embodiment, the sever 104 downloads items, upgrades, and/or other information to the user devices 102 via the network 106. The server 104 also receives various requests, instructions and other data from the user devices 102 via the network 106. The server 104 may include one or more machines (e.g., one or more server computer systems, routers, gateways) that have processing and storage capabilities to provide the above functionality.

Communication between the server 104 and a user device 102 may be enabled via any communication infrastructure. One example of such an infrastructure includes a combination of a wide area network (WAN) or a VPN and wireless infrastructure, which allows a user to use the user device 102 to purchase items and consume items without being tethered to the server 104 via hardwired links. The wireless infrastructure may be provided by a network operator (service provider) system that can be implemented using various data processing equipment, communication towers, etc. Alternatively, or in addition, the network operator system may rely on satellite technology to exchange information with the user device 102. Yet alternatively, or in combination, the wireless infrastructure may be provided by an access point (e.g., WiFi access point) provider system.

The communication infrastructure may also include a communication-enabling system that serves as an intermediary in passing information between the server 104 and the wireless network operator. The communication-enabling system may communicate with the wireless network operator via a dedicated channel, and may communicate with the server 104 via a non-dedicated communication mechanism, e.g., a public network such as the Internet.

The server 104 may pay the network operator a fee based on the aggregate use of the network operator system by all of the user devices 102. The server 104 may recoup these costs through fees charged to the end-users separately or as part of other purchases (e.g., purchase of digital content) made by the end-users. Alternatively, the network operator may submit bills directly to individual users, or may submits bills to either the server 104 (in aggregate) or to the individual users, at the option of the individual respective users.

A user device 102 may be associated with a specific network operator (service provider) by means of a subscriber identity module (SIM) card. A SIM card may include predefined lists of preferred wireless networks (e.g., PLMNs) that a user device 102 should use when acquiring service outside of the area covered by its own network operator. The entries and prioritization in the lists are usually based on agreements contracted among the various network operators. Alternatively, a user device 102 may be associated with a specific network operator based on data stored in memory (e.g., non-volatile memory), and predefined lists of preferred wireless networks (e.g., PLMNs) may also be stored in memory of the user device. When a user device 102 is camped on a PLMN that is not its home PLMN or the highest priority PLMN, the user device usually performs a PLMN scan trying to find its home PLMN or a higher priority PLMN. A PLMN scan is repeated at predetermined time intervals, as defined in a standard specification. For example, the 3GGP specification requires that a PLMN scan be performed every (6*n) minutes, where "n" is configurable by a service provider (e.g., in the SIM card). As discussed above, periodic network scans may result in increased current drain and unnecessary roaming charges.

Embodiments of the invention overcome the above shortcomings by allowing user devices 102 to adjust the rate of network scans based on network data collected by various user devices 102 at different locations. In one embodiment, the server 104 hosts a preferred network manager 110 that receives network data records provided by different user devices 102. A network data record identifies a first network from which a user device 102 was receiving service and a second network (preferred network) that was found by the user device when performing a preferred network scan on the first network. In one embodiment, if a user device 102 performs a preferred network scan and does not find any preferred networks, the user device 102 may provide to the server 104 a network data record that only identifies the first network. Optionally, such a network data record may also include an indication that no preferred network was found on the first network.

In one embodiment, each user device 102 hosts a preferred network subsystem 108 that adjusts the rate of preferred network scans based on network data records maintained by the server 104. In particular, upon a power-on event or a network change, the preferred network subsystem 108 identifies a network at a present location of the user device, requests records associated with the identified network from the server 104, and stores the records associated with the identified network in a local data store. Subsequently, when the user device camps on a new cell, the preferred network subsystem 108 searches the local data store for a record corresponding to the new cell. If the preferred network subsystem 108 finds a record corresponding to the new cell (and in some embodiments the found record specifies a preferred network), the preferred network subsystem 108 may initiate a preferred network scan without waiting for a predefined time interval (e.g., 6 minutes) to expire. If the preferred network subsystem 108 does not find a record corresponding to the new cell (or the found record does not specify a preferred network), the preferred network subsystem 108 may modify the predefined time interval to perform preferred network scans at a slower rate (e.g., every 12, 18 or 24 minutes).

In another embodiment, rather than pre-storing the records associated with the identified network in the local data store, the preferred network subsystem 108 may request such records from the server 104 at every expiry of the predefined time interval and then make a decision with respect to a preferred network scan.

Figure 2:
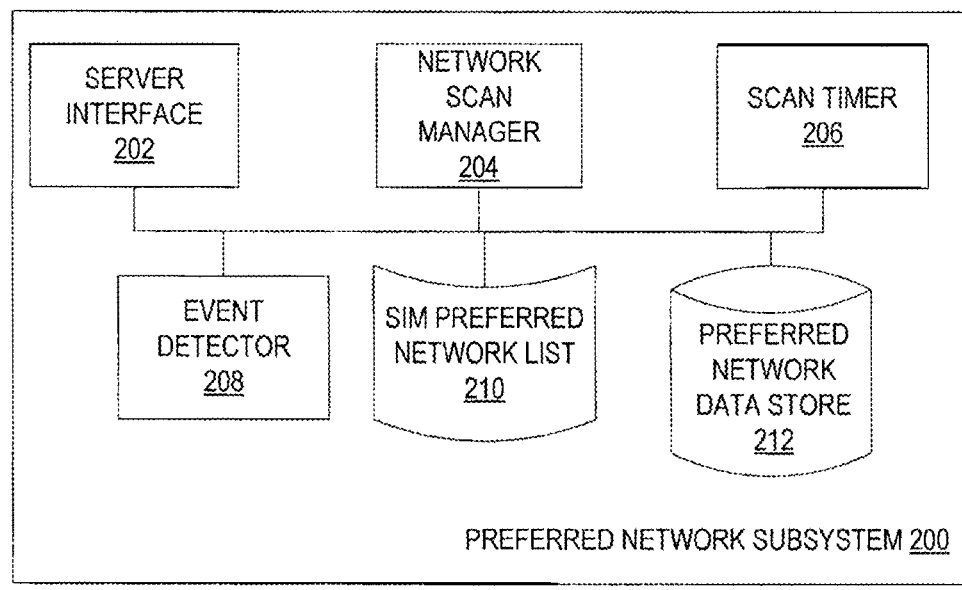
FIG. 2 is a block diagram of one embodiment of a preferred network subsystem.

FIG. 2 is a block diagram of one embodiment of a preferred network subsystem 200 hosted by a user device. The preferred network subsystem 200 may be the same as preferred network subsystem 108 of FIG. 1 and may include a server interface 202, a network scan manager 204, a scan timer 206, an event detector 208, a SIM preferred network list and preferred network data store 212. The components of the preferred network subsystem 200 may represent modules that can be combined together or separated into further modules, according to some embodiments.

The user device includes a SIM card that associates the user device with a specific network operator and stores predefined lists of preferred networks (e.g., SIM preferred network list(s) 210) that the user device should use when performing a preferred network scan on a network that is not its home network or the highest priority network. The SIM card may also store a configuration parameter that defines the rate of preferred network scans. For example, the 3GPP specification requires a network scan to be performed every 6*n minutes, where "6" is the constant and "n" is a configurable parameter that can be stored on the SIM card by the network operator. Alternatively, data associating the user device with a specific network operator, preferred network lists and a scan rate parameter may be stored in non-volatile memory of the user device.

The server interface 202 provides network data collected by the user device to the server. In particular, each time the network scan manager 204 performs a preferred network scan and finds a preferred network (the home network or a higher priority network than its current network), the network scan manager 204 records data associated with the current network and data associated with the found network, and the server interface 202 provides these recorded data to the server. The data associated with the current network may include, for example, an identifier of the current network (e.g., PLMN id) and characteristics of a current cell. In some embodiments, the data associated with the current network also includes current positional data of the user device. The data associated with the found network may include, for example, an identifier of the found network (e.g., PLMN id) and characteristics of a found cell. In some embodiments, the data associated with the found network also identifies other networks found at the current location of the user device. In one embodiment, if a user device performs a preferred network scan and does not find any preferred networks, the server interface 202 provides to the server a record that only includes data associated with the current network. Optionally, the record may also include an indication that no preferred network was found on the first network.

The event detector 208 is responsible for detecting new network events. These events may include, for example, a power-on event and a change of network (e.g., due to loss of service or coverage by the last registered network or a scan for a higher priority network). In one embodiment, upon detecting a new network event, the event detector 208 invokes the server interface 202 to request network data records associated with the new network from the server. If the server interface 202 receives the matching records from the server, the server interface 202 stores the received records in the preferred network data store 212. Received records include characteristics of cells of the new network on which user devices previously camped and characteristics of preferred networks that were found by the user devices when they were camped on those cells. In one embodiment, if no preferred network was found on a cell, a received record only includes characteristics of the cell (and optionally an indication that no preferred network was found on that cell). In one embodiment, prior to requesting records from the server, the server interface 202 checks whether the preferred network data store 212 already has recent records (e.g., received within a predefined time period) associated with the new network, and sends a request to the server only if the preferred network data store 212 does not have such records or has records that are no longer considered up-to-date.

The preferred network data store 212 may represent a single data structure or multiple data structures (tables, databases, repositories, files, etc.) residing on one or more mass storage devices, such as magnetic or optical storage based disks, solid-state drives or hard drives. In one embodiment, when the preferred network data store 212 reaches a certain size, newly received records are added by replacing the oldest records in the preferred network data store 212.

In one embodiment, the event detector 208 is also responsible for detecting new cell events that occur when the user device camps on a new cell (e.g., due to a cell reselection or after going out of service). Upon detecting a new cell event, the event detector 208 invokes the network scan manager 204 to determine whether a preferred network scan should be performed. In particular, the network scan manager 204 searches the preferred network data store for a record corresponding to the new cell. If the network scan manager 204 finds a record corresponding to the new cell (and in one embodiment, if the found record includes characteristics of a preferred network), then it is likely that the network scan manager 204 will find a preferred network (home or higher priority network) on the current cell. Hence, the network scan manager 204 performs a preferred network scan right away, without starting the scan timer 206 and/or waiting for it to expire. If the network scan manager 204 does not find a record corresponding to the new cell (or in one embodiment, the network scan manager 204 finds such a record but the found record does not include characteristics of a preferred network), then the network scan manager 204 starts the scan timer, which is set to a predetermined time interval (e.g., 6 minutes).

At the expiry of the scan timer 206, the network scan manager 204 searches the preferred network data store 212 for a record that matches characteristics of the current cell and includes characteristics of a preferred network. If such a record is found, the network scan manager 204 immediately initiates the preferred network scan. If no record that matches characteristics of the current cell is found, then it indicates that a preferred network scan has not been previously performed on the current cell. Hence, the network scan manager 204 starts the scan timer 206 which is set to a predefined time interval. If the record that matches characteristics of the current cell is found but the found record does not include characteristics of a preferred network, then it indicates that other user devices performed a preferred network scan on the current cell and did not find any preferred networks on the current cell. Hence, the network scan manager 204 increases the time interval of the scan timer 206 to perform preferred network scans at a slower rate (e.g., every 12, 18 or 24 minutes), and starts the scan timer 206. In one embodiment, the network scan manager 204 determines an increased time interval for the scan timer 206 by finding, in the preferred network data store, a record having the closest location data with respect to the current location of the user device, calculating the distance between the closest location data specified in the record and the current location of the user device, and determining an increased time interval corresponding to the calculated distance. For example, several distance ranges may be provided, with each distance range corresponding to a specific time interval.

In another embodiment, network data records are not pre-stored in the preferred network data store 212. Rather, at a predefined event, the network scan manager 204 requests records associated with the new network and/or the new cell from the server 104 and then makes a decision with respect to a preferred network scan as discussed above. A predefined event may occur at every expiry of the scan timer 206 or every time the scan timer 206 is about to be initiated.

Figure 3:
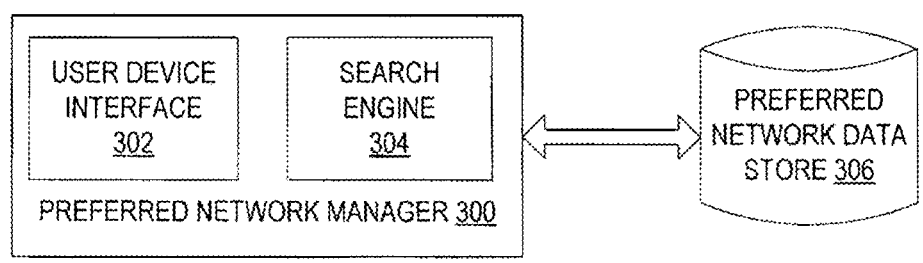
FIG. 3 is a block diagram of one embodiment of a preferred network manager.

FIG. 3 is a block diagram of one embodiment of a preferred network manager 300 hosted by a server. The preferred network manager 300 may be the same as preferred network manager 110 of FIG. 1. The preferred network manager 300 may include a user device interface 302, a search engine 304, and a preferred network data store 306. The components of the preferred network manager 300 may represent modules that can be combined together or separated into further modules, according to some embodiments.

The user device interface 302 receives network data records from various user devices and stores these records in the preferred network data store 306. A network data record may include data for a first network from which a user device was receiving service and data for a second network that was found by the user device when it performed a preferred network scan while receiving service from the first network. The data for the first network may include, for example, an identifier of the first network (e.g., PLMN id) and characteristics of a cell on which the second network was found. In some embodiments, the data for the first network also includes positional data of the user device at the time of the preferred network scan. The data for the second network may include, for example, an identifier of the second network (e.g., PLMN id) and characteristics of a found cell. In some embodiments, the data for the second network also identifies other networks found by the user device during the preferred network scan. In one embodiment, if a user device performed a preferred network scan and did not find any preferred networks, the user device provides a network data record that only includes data for the first network (and optionally an indication that no preferred network was found on the first network). The preferred network data store 306 may represent a single data structure or multiple data structures (tables, databases, repositories, files, etc.) residing on one or more mass storage devices, such as magnetic or optical storage based disks, solid-state drives or hard drives.

Further, the user device interface 302 may receive requests for network data records from various user devices, where each request identifies a network of interest. Upon receiving such a request, the user device interface 302 invokes the search engine 304 to search the preferred network data store 306 for records associated with the network of interest. If the search engine 304 finds any matching records, the user device interface 302 returns the found records to the requesting user device. If not, the user device interface 302 sends a "no record found" message to the requesting user device.

Figure 4:
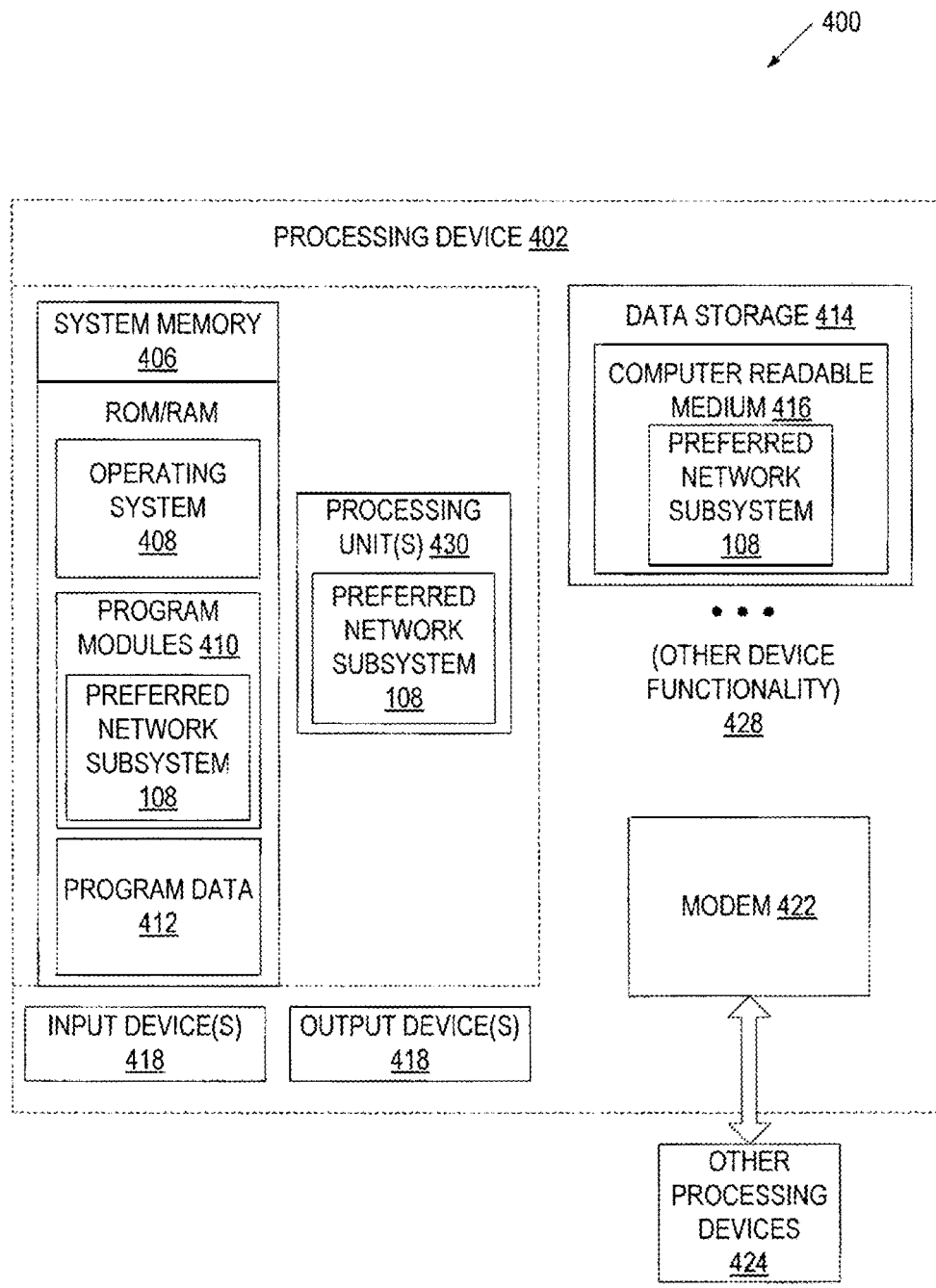
FIG. 4 is a block diagram illustrating an exemplary user device.

FIG. 4 is a block diagram illustrating an exemplary user device 400. The user device 400 may be the same as user device 102 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 400 includes one or more processing units 404, such as one or more CPUs. The user device 400 also includes system memory 406, which may correspond to any combination of volatile and/or non-volatile storage mechanisms. The system memory 406 may store information which provides an operating system component 408, various program modules 410 including preferred network subsystem 108, program data 412, and/or other components. The user device 400 performs functions by using the processing unit(s) 404 to execute the preferred network subsystem 108 and other instructions provided by the system memory 406.

The user device 400 may also include a data storage device 414 that may consist of one or more types of removable storage and/or one or more types of non-removal storage. The data storage device 414 may include a computer-readable medium 416 on which is stored one or more sets of instructions (e.g., instructions of the preferred network subsystem 108) embodying any one or more of the methodologies or functions described herein. As shown, instructions of the preferred network subsystem 108 may also reside, completely or at least partially, within the system memory 406 and/or within the processing unit(s) 430 during execution thereof by the user device 400, the system memory 406 and the processing unit(s) 430 also constituting computer-readable media. The instructions of the world SIM manager 108 may further be transmitted or received over a network.

The user device 400 may also include one or more input devices 418 (keyboard, mouse device, specialized selection keys, etc.) and one or more output devices 420 (displays, printers, audio output mechanisms, etc.). The user device 400 may further include a wireless modem 422 to allow the user device 400 to communicate via a wireless network with other computing devices 424, such as remote computers, the item providing system, and so forth. The wireless modem 422 may allow the user device 400 to receive a telephone ring and also communicate with the item providing system in a data mode. The wireless modem 422 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), WiFi, long term evaluation (LTE) and WiMax.

The above-enumerated list of modules is representative and is not exhaustive of the types of functions performed by the user device 400. As indicated by the label "Other Device Functionality" 428, the user device 400 may include additional functions.

FIGS. 5, 6, 7 and 8 are flow diagrams of some embodiments of client-side methods. The methods are performed by processing logic that may comprise hardware (circuitry, dedicated logic, etc.), software (such as is run on a general purpose computer system or a dedicated machine), or a combination of both. In one embodiment, embodiments of the methods are performed by a user device (e.g., a preferred network subsystem 108 of user device 102 of FIG. 1).

Figure 5:
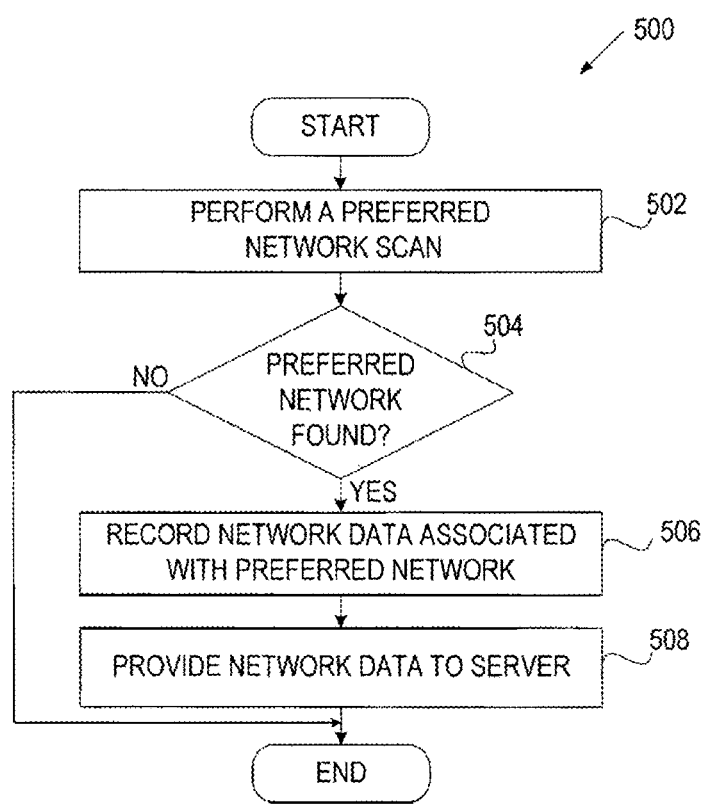
FIG. 5 is a flow diagram of one embodiment of a method for capturing preferred network data.

FIG. 5 is a flow diagram of one embodiment of a method 500 for capturing network data. At block 502, the user device performs a preferred network scan. At block 504, the user device determines if a preferred network is found. If so, the user device records network data associated with the preferred network (block 506) and then provides the network data to a server (block 508). The server may be a cloud server, a content provider server, a network operator server, etc. The user device may provide the network data to the server upon recording it or the user device may periodically upload network data collected over a period of time to the server. Exemplary table 1 for storing the network data is provided below.

TABLE 1

| Current Network Data | Preferred Network Data |
| --- | --- |
| PLMN id, cell id, arfcn, scrambling code, rscp, ecno, longitude, latitude | PLMN id, cell id, arfcn, scrambling code, rscp, ecno, available PLMN list |

As shown, exemplary Table 1 includes 2 columns—a current network data column and a preferred network data column. The current network data column may include an identifier of a network (PLMN id) and an identifier of a cell on which a preferred network was found; characteristics of this cell such as an absolute radio-frequency channel number (rfcn) and a scrambling code associated with the cell; characteristics of a signal at the cell such as received signal code power (rscp) and signal to noise ratio (ecno); and positional data of the user device at the time of the preferred network scan such as the longitude and latitude. The preferred network column may include an identifier of the found network (PLMN id) and an identifier of the found cell; characteristics of the found cell such as an absolute radio-frequency channel number (rfcn) and a scrambling code; characteristics of a signal at the found cell such as received signal code power (rscp) and signal to noise ratio (ecno); and a list of other available networks (available PLMN list) found during the preferred network scan.

In one embodiment, if a preferred network is not found at block 504, the user device records the current network data and provides the current network data to the server. The user device may keep the preferred network data column empty or include an indication that no preferred network was found on the current network.

It should be noted that Table 1 is provided for illustration purposes only. A person of ordinary skill in the art will understand that various other data structures, formats and characteristics may be used with network data captured by a user device during a preferred network scan.

Figure 6:
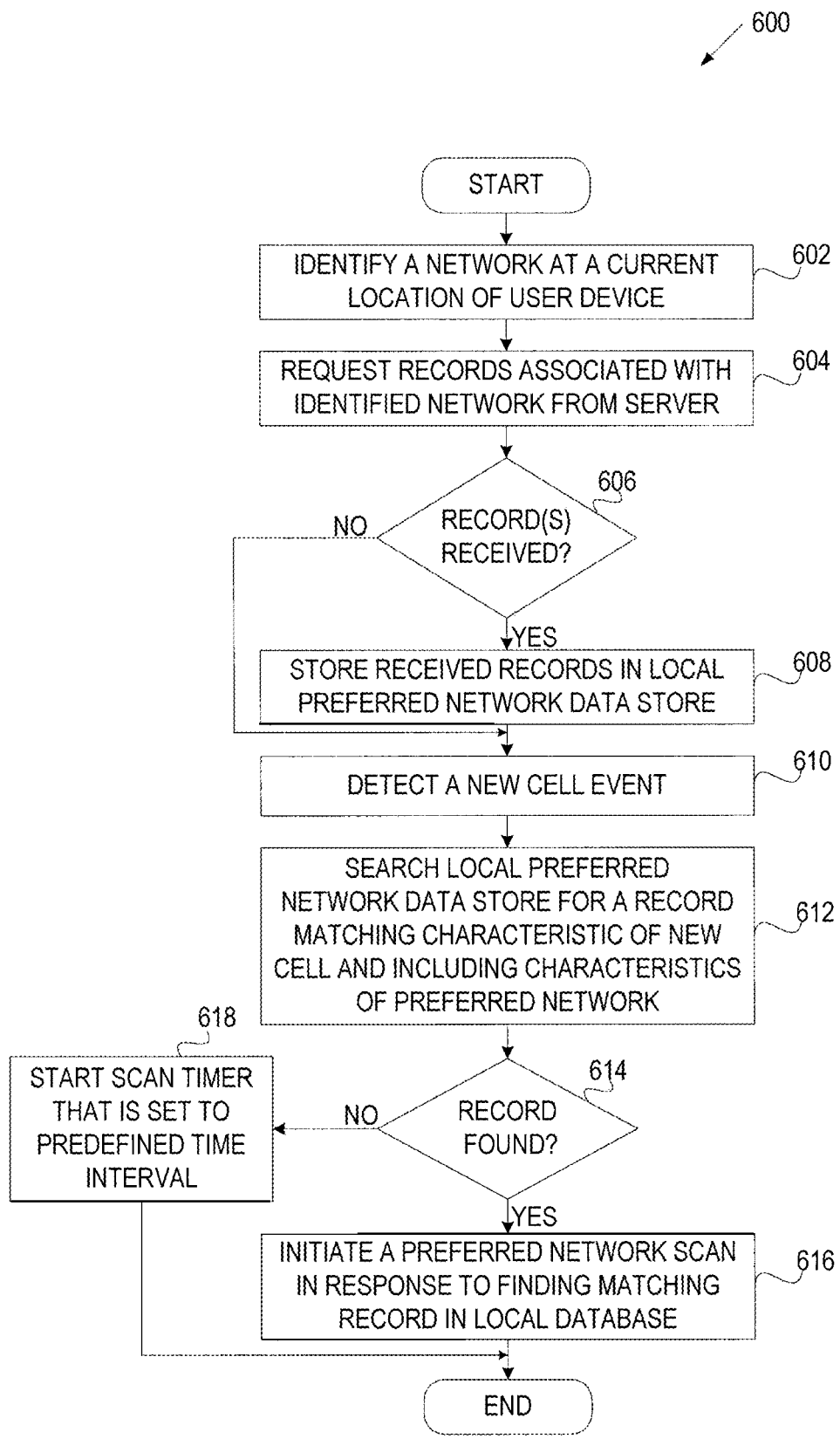
FIG. 6 is a flow diagram of one embodiment of a method for expediting a preferred network scan.

FIG. 6 is a flow diagram of one embodiment of a method 600 for expediting a preferred network scan. Method 600 begins with the user device identifying a network at its current location (block 602). This may be done in response to the power-on event or a change of a network (e.g., due to loss of service or coverage). At block 604, the user device requests records associated with the identified network from the server. If the user device receives any records associated with the identified networks from the server (block 606), the user device stores the received records in a local preferred network data store (block 608).

Subsequently, at block 610, the user device detects a new cell event, which may occur, for example, due to a cell reselection or when the user device reacquires service. In response to the new cell event, the user device searches the local preferred network data store for a record that matches characteristics of a new cell (block 612). If the matching record is found (block 614), the user device initiates a preferred network scan (block 616), without starting the scan timer and/or waiting for the scan timer to expire. In one embodiment, the user device performs block 616 not only if the matching record is found but also if the matching record includes data specifying a preferred network.

If the matching record is not found, the user device starts the scan timer that is set to a predefined time interval (block 618). In one embodiment, block 618 is also performed if the matching record is found but it does not include data specifying a preferred network.

In an alternative embodiment, network data records are not pre-stored in the local preferred network data store. Rather, the user device detects a new cell event at block 610 and then requests records associated with the new cell from the server. In particular, the user device may requests these records each time the user device is about to start the scan timer or at every expiry of the scan timer. If the server does not return any records associated with the new cell or returns a record indicating that no preferred network was previously found on the new cell, then the user device starts the scan timer that is set to a predefined time interval. If the server returns a record associated with the new cell and including characteristics a of preferred network, then the user device initiates a preferred network scan right away without waiting for the scan timer to expire.

Figure 7:
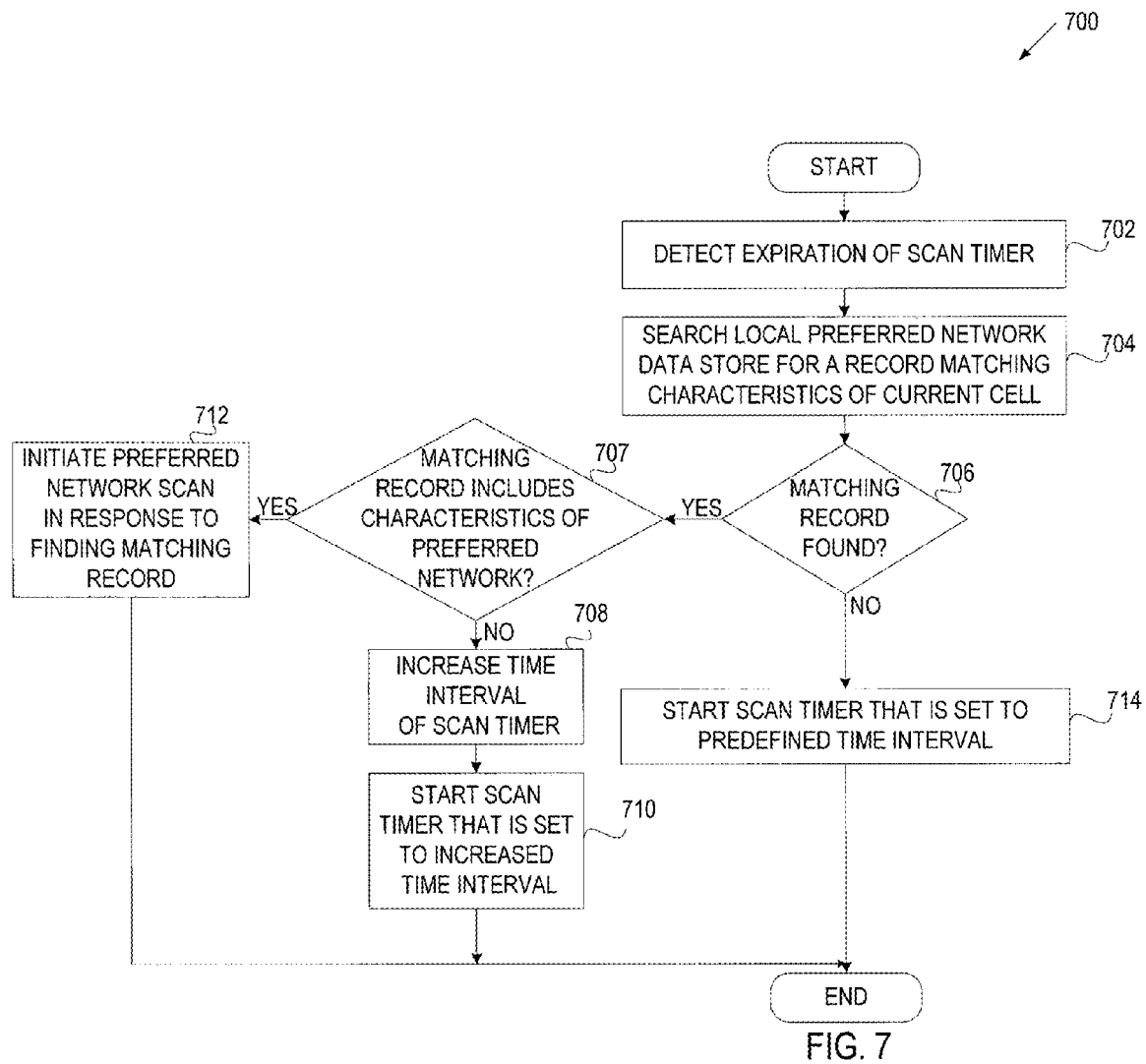
FIG. 7 is a flow diagram of one embodiment of a method for reducing a rate of preferred network scans.

FIG. 7 is a flow diagram of one embodiment of a method 700 for reducing a rate of preferred network scans. In one embodiment, method 700 is performed after block 618 of FIG. 6.

Referring to FIG. 7, the user device detects that the scan timer has expired (block 702) and searches the local preferred network data store for a record matching characteristics of the cell on which the user device is currently camped (block 704). If the user device does not find the matching record (block 706), the user device starts the scan timer that is set to a predefined time interval (block 714). If the user device finds the matching record (block 706), the user device further determines whether the matching record includes characteristics of a preferred network (block 707). If so, the user device initiates a preferred network scan without starting the scan timer (block 712). If not, the user device adjusts the time interval of the scan timer to perform preferred network scans at a slower rate (block 708). In one embodiment, the user device increases the time interval of the scan timer using positional information of the user device, as will be discussed in more detail below in conjunction with FIG. 8. In another embodiment, in which the user device is not GPS-enabled, the user device increases the time interval to a default value (e.g., 12, 18 or 24 minutes). At block 710, the user device starts the scan timer that is set to the increased time interval.

Figure 8:
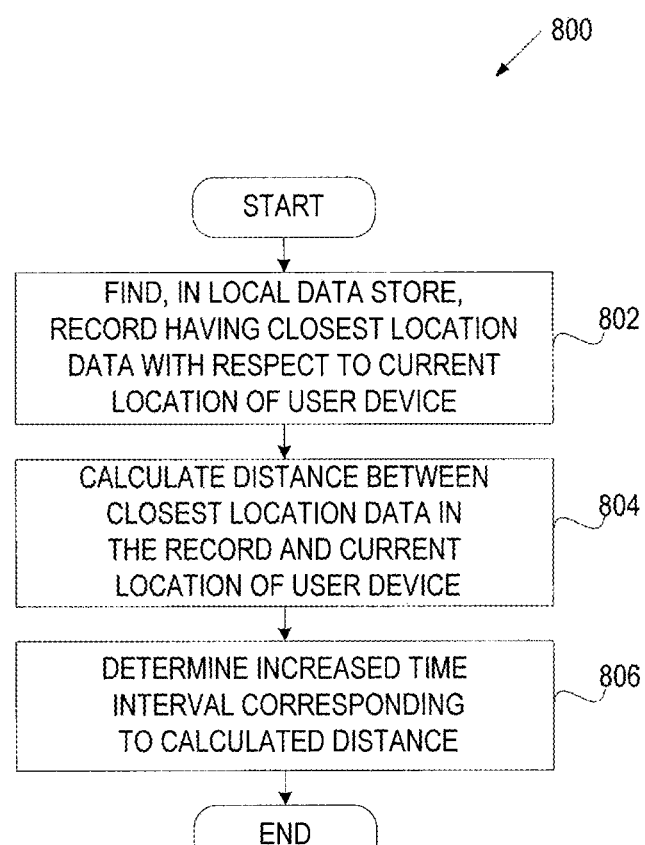
FIG. 8 is a flow diagram of one embodiment of a method for increasing a time interval of a scan timer.

FIG. 8 is a flow diagram of one embodiment of a method 800 for increasing a time interval of a scan timer of a user device. At block 802, the user device searches a local preferred network data store for a record having the closest location data with respect to the current location of user device. Upon finding such a record, the user device calculates the distance between the closest location data specified in the found record and the current location of the user device (block 804). At block 806, the user device determines an increased time interval corresponding to the calculated distance. For example, the user device may have multiple ranges of distances and increased item intervals corresponding to individual ranges of distances, and may identify an increased time interval that corresponds to the distance range where the distance calculated at block 804 belongs.

Figure 9:
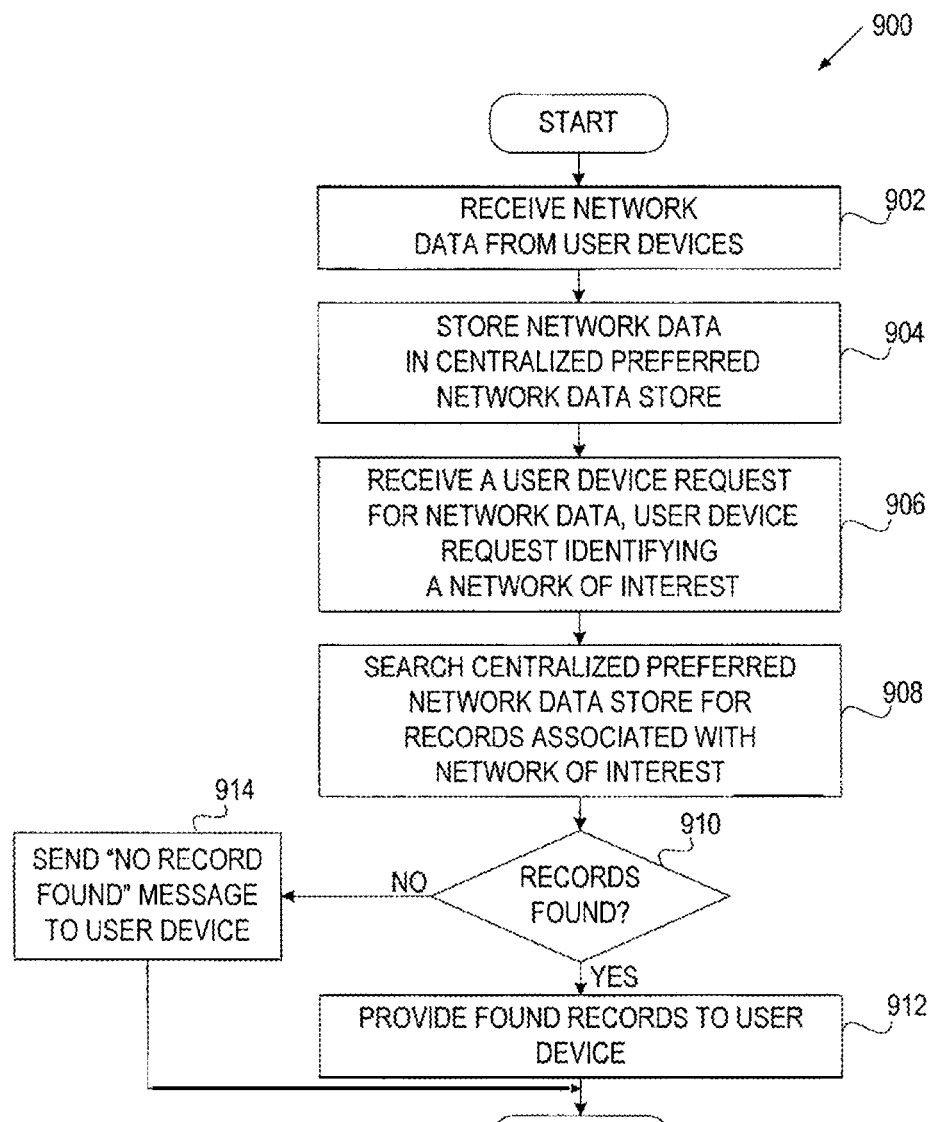
FIG. 9 is a flow diagram of one embodiment of a server-side method for assisting in preferred network scans.

FIG. 9 is a diagram of one embodiment of a server-side method 900 for assisting in preferred network scans. The method is performed by processing logic that may comprise hardware (circuitry, dedicated logic, etc.), software (such as is run on a general purpose computer system or a dedicated machine), or a combination of both. In one embodiment, the method is performed by a server (e.g., a preferred network manager 110 of a server 104 of FIG. 1).

Referring to FIG. 9, method 900 begins with a server receiving network data from user devices. At block 904, the server stores network data in a centralized preferred network data store. As discussed above, a network data record received from a user device includes data for a network on which the user device was camped when performing a preferred network scan, and data for a network that was found during the preferred network scan. If no preferred network was found, a network data record may only include data for a network on which the user device was camped when performing a preferred network scan (and optionally an indication that no network was found during the preferred network scan).

Subsequently, at block 906, the server receives a user device request for network data, where the request identifies a network of interest. At block 908, the server searches the centralized preferred network data store for records associated with the network of interest (e.g., the current network of the user device). At block 910, the server determines if any records are found. If not, the server sends a "no record found" message to the user device (block 914). If so, the server provides the found records to the user device (block 912).

In one embodiment, if the server subsequently receives records associated with the network of interest from other user devices, the server sends these records to the user device that previously requested records associated with this network.

Figure 10:
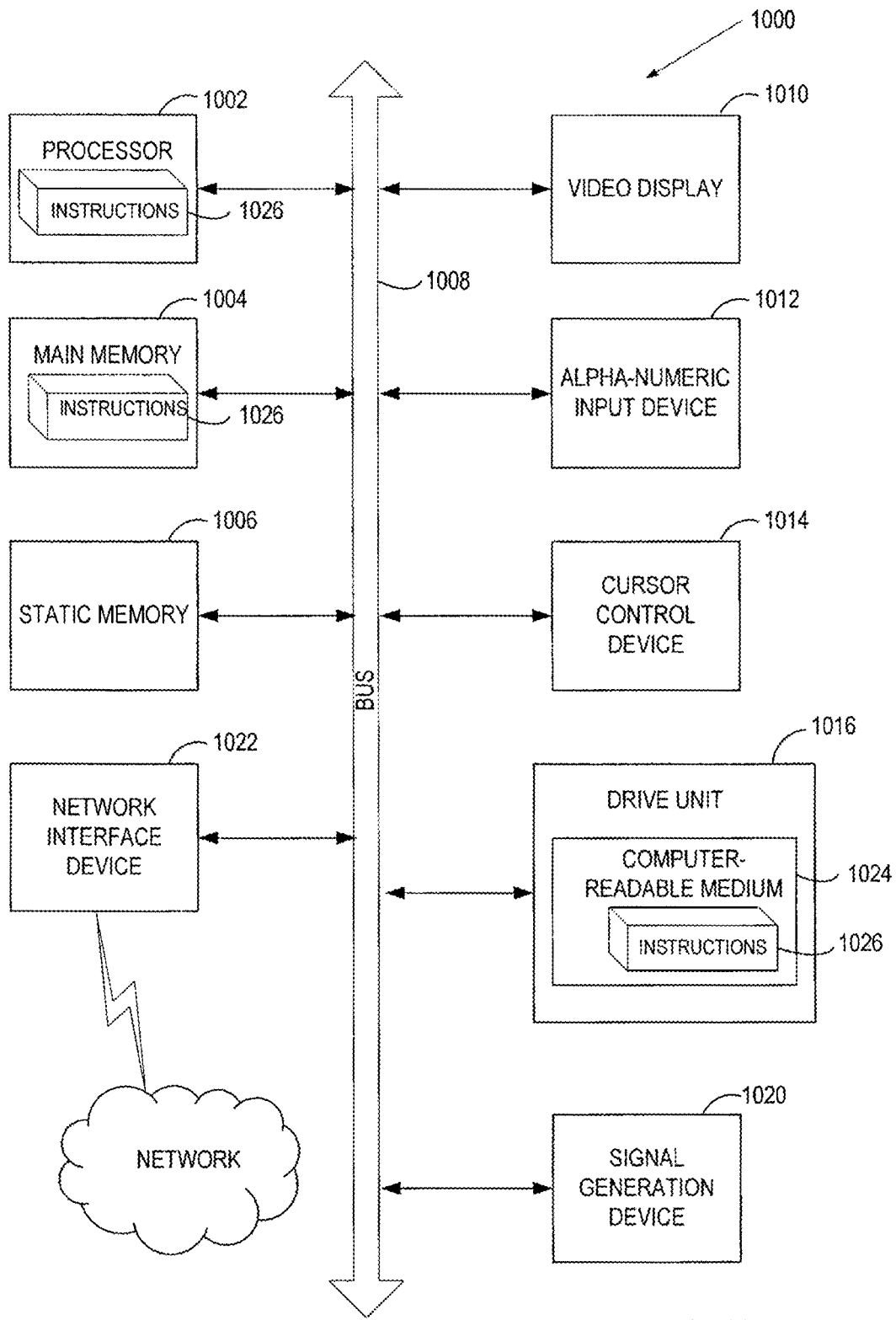
FIG. 10 illustrates an exemplary server assisting in preferred network scans.

FIG. 10 illustrates an exemplary server 1000 that assists in preferred network scans.

The server 1000 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing system (processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1016, which communicate with each other via a bus 1006.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute the preferred network manager 110 for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1016 may include a computer-readable medium 1024 on which is stored one or more sets of instructions (e.g., instructions of preferred network manager 110) embodying any one or more of the methodologies or functions described herein. The preferred network manager 110 may also reside, completely or at least partially, within the main memory 1004 and/or within the processor 1002 during execution thereof by the computer system 1000, the main memory 1004 and the processor 1002 also constituting computer-readable media. The preferred network manager 110 may further be transmitted or received over a network 1020 via the network interface device 1022.

While the computer-readable storage medium 1024 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for a user device, comprising:
   identifying a network at a present location of the user device;
   obtaining one or more records associated with the identified network from a server;
   storing, by a processing device, the records associated with the identified network in a local data store, the records specifying a preferred network previously found by another user device while receiving service from the identified network;
   upon detecting a new cell event, searching the local data store for a record corresponding to a new cell; and
   in response to finding the record corresponding to the new cell and specifying the preferred network, initiating a preferred network scan.

2. The method of claim 1 wherein the obtaining occurs in response to at least one of a power-on event or a network change.

3. The method of claim 1 wherein the new cell event is one of a cell reselection, or a reacquisition of lost service or coverage.

4. The method of claim 1 further comprising:
   upon finding a preferred network during the preferred network scan, recording current network data specifying a current network of the user device and preferred network data identifying the found preferred network; and
   providing the current network data and the preferred network data to the server to maintain a record associated with the current network in a centralized data store.

5. The method of claim 4 wherein the current network data comprises an identifier of the current network, one or more characteristics of a current cell, one or more characteristics of a signal at the current cell, and positional data of the user device.

6. The method of claim 4 wherein the preferred network data comprises an identifier of the preferred network, one or more characteristics of a found cell of the preferred network, one or more characteristics of a signal at the found cell, and one or more other networks found at the current location of the user device.

7. The method of claim 1 further comprising:
   upon determining that no preferred network is found during the preferred network scan, recording current network data specifying a current network of the user device; and
   providing the current network data to the server to maintain a record associated with the current network in a centralized data store.

8. The method of claim 1 wherein the preferred network scan is initiated without waiting for a scan timer to expire.

9. The method of claim 1 wherein the server is any one comprises at least one of a cloud server, a service provider server, or a content provider server.

10. The method of claim 1 further comprising:
    upon determining that the local data store does not include a record corresponding to the new cell, initiating a scan timer set to a predefined time interval;
    when the scan timer expires, searching the local data store for a record corresponding to a current cell of the user device;
    upon finding the record corresponding to the current cell, determining whether the found record specifies a preferred network; and
    upon determining that the found record does not specify a preferred network, adjusting the scan timer to increase the predefined time interval.

11. The method of claim 10 wherein adjusting the scan timer comprises:
    finding, in the local data store, a record having the closest location data with respect to the present location of the user device;
    identifying a distance between the closest location data in the found record and the present location of the user device; and
    increasing the predefined time interval in accordance with the identified distance.

12. A non-transitory computer readable storage medium including instructions that, when executed by a processing device, cause the processing system to perform operations, comprising:
    receiving network data records from a plurality of user devices, wherein a network data record comprises current network data identifying a current network of a user device and preferred network data identifying a preferred network found by the user device while receiving service from the current network;
    storing the received network data records in a centralized data store;
    receiving a client request for one or more network data records associated with a network of interest;
    searching, by the processing device, the centralized data store for the network data records associated with the network of interest, the records specifying the preferred network previously found by another user device while receiving service from the current network; and providing the network data records associated with the network of interest to a requestor.

13. The computer readable storage medium of claim 12 wherein the network data records comprise at least one network data record that includes current network data but not preferred network data, indicating that no preferred network was found on the current network.

14. The computer readable storage medium of claim 12 wherein the current network data comprises an identifier of the current network, one or more characteristics of a current cell, one or more characteristics of a signal at the current cell, and positional data of the user device.

15. The computer readable storage medium of claim 14 wherein the preferred network data comprises an identifier of the preferred network, one or more characteristics of a found cell of the preferred network, one or more characteristics of a signal at the found cell, and one or more other networks found at the current location of the user device.

16. A user device apparatus comprising:
a memory having a local network data store;
a processor, coupled to the memory; and
a preferred network subsystem, executed by the processor, to detect that a scan timer set to a predefined time interval has expired, to search the local network data store for a record corresponding to a current cell of a user device, to determine that the local data store does not include the record corresponding to the current cell, and to increase the predefined time interval of the scan timer.

17. The apparatus of claim 16 wherein the preferred network subsystem is further to find the record corresponding to the current cell in the local data store, to determine whether the found record specifies a preferred network, and upon determining that the found record does not specify a preferred network, to adjust the scan timer to increase the predefined time interval.

18. The apparatus of claim 16 wherein the preferred network subsystem is to increase the predefined time interval of the scan timer by:
finding, in the local data store, a record having the closest location data with respect to a present location of the user device;
identifying a distance between the closest location data in the found record and the present location of the user device; and
increasing the predefined time interval in accordance with the identified distance.

19. A computer-implemented method for a user device, comprising:
identifying a cell at a present location of the user device;
requesting one or more records associated with the identified cell from a server;
if the server does not provide any records associated with the identified cell, starting a scan timer that is set to a predefined time interval;
if the server provides a record associated with the identified cell, determining whether the provided record includes preferred network data identifying a preferred network previously found on the identified cell;
if the provided record does not include the preferred network data, starting a scan timer that is set to a predefined time interval; and
if the provided record includes the preferred network data, initiating a preferred network scan without starting the scan timer.

20. The method of claim 19 further comprising:
upon finding a preferred network during the preferred network scan, recording current network data specifying a current network of the user device and preferred network data identifying the found preferred network; and
providing the current network data and the preferred network data to the server to maintain a record associated with the current network in a centralized data store.

21. The method of claim 20 wherein the current network data comprises an identifier of the current network, one or more characteristics of a current cell, one or more characteristics of a signal at the current cell, and positional data of the user device.

22. The method of claim 21 wherein the preferred network data comprises an identifier of the preferred network, one or more characteristics of a found cell of the preferred network, one or more characteristics of a signal at the found cell, and one or more other networks found at the current location of the user device.

23. The method of claim 20 further comprising:
upon determining that no preferred network is found during the preferred network scan, recording current network data specifying a current network of the user device; and
providing the current network data to the server to maintain a record associated with the current network in a centralized data store.

24. The method of claim 20 wherein the server is any comprises at least one of a cloud server, a service provider server, and or a content provider server.

* * * * *